(12) United States Patent
Yip et al.

(10) Patent No.: US 9,488,971 B2
(45) Date of Patent: Nov. 8, 2016

(54) MODEL-LESS CONTROL FOR FLEXIBLE MANIPULATORS

(71) Applicant: The Board of Trustees of the Leland Stanford Junior University, Palo Alto, CA (US)

(72) Inventors: Michael Yip, Redwood City, CA (US); David B. Camarillo, Aptos, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 309 days.

(21) Appl. No.: 14/197,739

(22) Filed: Mar. 5, 2014

(65) Prior Publication Data

US 2014/0257569 A1    Sep. 11, 2014

Related U.S. Application Data

(60) Provisional application No. 61/776,622, filed on Mar. 11, 2013.

(51) Int. Cl.
*G05B 15/02* (2006.01)
*G05B 19/00* (2006.01)
*B25J 9/16* (2006.01)

(52) U.S. Cl.
CPC .............. *G05B 15/02* (2013.01); *B25J 9/1602* (2013.01); *G05B 19/00* (2013.01); *G05B 2219/45117* (2013.01)

(58) Field of Classification Search
None
See application file for complete search history.

(56) References Cited

U.S. PATENT DOCUMENTS

| | | |
|---|---|---|
| 6,278,906 B1 | 8/2001 | Piepmeier et al. |
| 8,301,421 B2 | 10/2012 | Bacon et al. |
| 8,364,308 B2 | 1/2013 | Hong et al. |
| 8,406,989 B1 | 3/2013 | Bhattacharyya et al. |
| 8,442,685 B2 | 5/2013 | Ooga et al. |

(Continued)

FOREIGN PATENT DOCUMENTS

| | | |
|---|---|---|
| EP | 2 497 610 | 9/2012 |
| JP | 3029286 B2 | 4/2000 |
| JP | 2014-108466 A | 6/2014 |

OTHER PUBLICATIONS

Cheah et al., "Feedback Control for Robotic Manipulator with Uncertain Kinematics and Dynamics", 1998, IEEE. pp. 3607-3612.*

(Continued)

*Primary Examiner* — Qing Wu
(74) *Attorney, Agent, or Firm* — Foley & Lardner LLP; Cliff Z. Liu; Angela D. Murch

(57) ABSTRACT

A control method includes empirically constructing for a flexible manipulator an estimated mapping between an end-effector movement and a plurality of values representing movement of at least one actuator, measuring an actual end-effector movement and an actual movement of the at least one actuator, and, based on the measuring, updating the estimated mapping while the flexible manipulator is active such that the mapping is adapted to the present environment of the flexible manipulator.

22 Claims, 15 Drawing Sheets

(56) References Cited

U.S. PATENT DOCUMENTS

| | | |
|---|---|---|
| 8,460,236 B2 | 6/2013 | Roelle et al. |
| 2010/0256558 A1 | 10/2010 | Olson et al. |
| 2011/0066160 A1 | 3/2011 | Simaan et al. |
| 2011/0071677 A1 | 3/2011 | Stilman |
| 2011/0230894 A1 | 9/2011 | Simaan et al. |
| 2011/0319714 A1 | 12/2011 | Roelle et al. |
| 2012/0210802 A1 | 8/2012 | Sarh et al. |
| 2012/0330198 A1 | 12/2012 | Patoglu |
| 2013/0041508 A1 | 2/2013 | Hu et al. |
| 2013/0158978 A1 | 6/2013 | Banke et al. |
| 2013/0165945 A9 | 6/2013 | Roelle et al. |
| 2014/0156066 A1 | 6/2014 | Sakano |
| 2014/0257569 A1 | 9/2014 | Yip et al. |

OTHER PUBLICATIONS

Cheah, C.C., "Approximate Jacobian Robot Control with Adaptive Jacobian Matrix," Proceedings of the 42nd IEEE Conf. on Decision and Control, Maui, Hawaii, pp. 5859-5864 (2003).

Codourey, A., et al., "A Body-oriented Method for Dynamic Modeling and Adaptive Control of Fully Parallel Robots," IEEE International Conference on Robotics and Automation, Albuquerque, 8 pages (1997).

Shademan, A., "Uncalibrated Vision-Based Control and Motion Planning of Robotic Arms in Unstructured Environments," Univ. of Alberta, Dept. of Computing Science, Thesis, 134 pages (2012).

International Search Report and Written Opinion for International Application No. PCT/US2015/058651, dated Feb. 1, 2016.

* cited by examiner

MODEL-LESS CONTROL FOR FLEXIBLE MANIPULATORS

CROSS-REFERENCE TO RELATED PATENT APPLICATIONS

This application claims the benefit of U.S. Provisional Patent Application 61/776,622 filed Mar. 11, 2013 to Yip et al., titled "Model-Less Control For Continuum and Redundant Robots," the contents of which are incorporated herein by reference in their entirety.

BACKGROUND

A benefit of a flexible manipulator is that it can be placed into constrained environments, where its body can conform around and interact with obstacles in a safe manner. Because of this, flexible manipulators have a fast-growing number of applications, including in medicine, where the flexibility of a manipulator allows for safe, minimally invasive interventions. However, because the flexibility of the manipulator body may allow for infinite degrees of freedom, it is a challenging task to accurately model and then control the positioning of the manipulator, especially in the presence of constraints. Accordingly, problems with models arise when a flexible manipulator is introduced into an environment with unknown constraints.

SUMMARY

In one aspect, a control method includes empirically constructing for a flexible manipulator an estimated mapping between a movement of at least one actuator and a movement of an end-effector, measuring an actual movement of the at least one actuator and an actual end-effector movement, and based on the measuring, updating the estimated mapping while the flexible manipulator is active such that the mapping is adapted to the present environment of the flexible manipulator.

In another aspect, a controller for a flexible manipulator includes an input interface coupled to a plurality of sensors, the sensors configured to sense movement of at least one actuator and an end-effector of the flexible manipulator, an output interface, and a processor in communication with the input interface and the output interface. The processor is configured to: provide at least one expected actuator movement value to the output interface; receive from the input interface information representing an actual actuator movement and an actual end-effector movement; and update an estimated mapping between actuator movement and end-effector movement based on the received information. The estimated mapping is updated while the flexible manipulator is active such that the flexible manipulator adapts to its present environment.

In another aspect, a non-transitory computer-readable medium includes computer-executable instructions to identify a desired end-effector movement for a flexible manipulator, determine from a predefined mapping at least one value for actuating at least one actuator, the value estimated to effectuate the desired end-effector movement by actuating the at least one actuator, receive information representing an actual movement of the at least one actuator and an actual movement of the end-effector resulting from application of the at least one value, and update the mapping based on the received information to adapt the flexible manipulator to its present environment.

DETAILED DESCRIPTION

Manipulators are used in a variety of fields, including in medicine. Manipulators in medicine include catheters, flexible arm manipulators, endoscopes, flexible camera probes, and inter-cavity ultrasound probes. Manipulators may be highly constrained when used in medical applications. For example, catheters and endoscopes are physically constrained by the vessels and tissues through which they travel. The mapping between actuator control and manipulator motion may vary due to constraints or other changes in the environment, and as such it is often not intuitive for a human operator to control the manipulator. An autonomous or semi-autonomous manipulator may be used, but if control of such a manipulator is based on a model of the manipulator, the actual environment should be known a priori, and the effects of the environment on the manipulator should be known and incorporated into the model. Thus, model-based manipulator control may not be adaptable to many medical environments.

Additionally, a flexible manipulator may have many degrees of freedom (including infinite or nearly infinite degrees of freedom) but a finite number of sensors, and thus the environment can affect the configuration of the manipulator in an unknown manner. The resulting unknown true configuration of the manipulator may lead to artificial singularities and unstable behavior in a manipulator using model-based control.

Instead of model-based control of a flexible manipulator, which may be unpredictable and unstable, this disclosure describes model-less control of a flexible manipulator that adapts to changes in the environment. Using model-less control, a flexible manipulator is able to navigate a range of environments, effectively expanding the manipulator's reachable workspace, and enabling the manipulator to interact with its environment in a stable manner.

Figure 1:
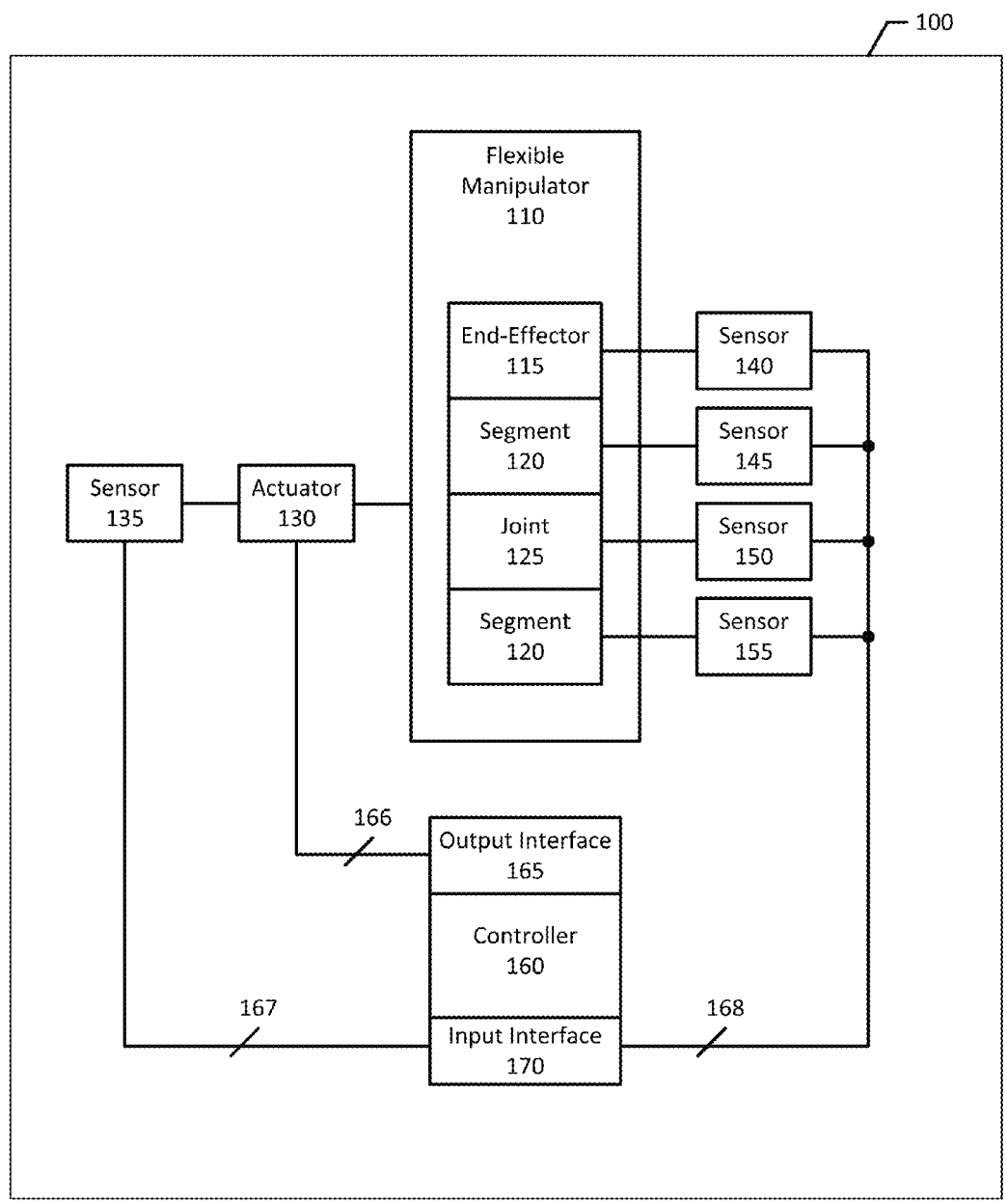
FIG. 1 illustrates an example of a system for controlling a flexible manipulator.

FIG. 1 illustrates an example of a system 100 in which a flexible manipulator 110 is controlled. Flexible manipulator 110 includes an end-effector 115, which is the mechanism at the end of flexible manipulator 110. End-effector 115 may include various devices, such as cutting, drilling, scooping, suctioning, flushing, injecting, imaging, or other devices.

Flexible manipulator 110 further includes one or more segments 120, and optionally one or more joints 125. A segment 120 is continuous, and may be formed of a flexible or an inflexible material. A joint 125 may be a sliding element, or a rotational element with one or more degrees of freedom. Flexible manipulator 110 is illustrated by way of example with two segments 120 connected by a joint 125, where end-effector 115 is connected directly to a segment 120. Other configurations are also possible, such as the inclusion of a joint 125 between end-effector 115 and the first segment 120; or end-effector 115 connected to a joint 125 which is connected to a single flexible segment 120; or end-effector 115 connected to a single flexible segment 120 with no joints 125.

Thus, flexible manipulator 110 is flexible over its length, where the flexibility may be from the material used to form flexible manipulator 110, or from multiple inflexible or flexible segments 120 connected together with joints 125, or from a combination of flexible and inflexible segments 120 with one or more joints 125.

One or more actuators 130 control movement of flexible manipulator 110. Actuator 130 may be a motor, hydraulic device, pneumatic device, tendon, wire, or other device that applies a force to a segment 120, joint 125, or end-effector 115. Application of the force generally involves a movement of a portion of actuator 130, such as, for example, movement of a piston, rotation of a gear, or tensioning of a wire. The movement of the portion of actuator 130 is referred to generally as $\Delta y$ herein. The force(s) applied causes the associated segment 120, joint 125, or end-effector 115 to move a distance. The distance moved by any portion of flexible manipulator 110 is referred to generally as $\Delta x$ herein.

One or more sensors 135 sense the position and/or movement of actuator(s) 130; one or more sensors 140 sense the position and/or movement of end-effector 115; one or more sensors 145, 155 sense the position and/or movement of segment(s) 120, and one or more sensors 150 sense the position and/or movement of joint(s) 125. Sensors 135, 140, 145, 150, and 155 are, for example, one of: absolute or relative position sensor, velocity sensor, accelerometer, gyroscope, magnetometer, infrared sensor, ultrasound sensor, imaging sensor, thermal sensor, thermopile sensor, camera, stereo cameras, magnetic sensor, angle encoder, potentiometer, string potentiometer, linear variable differential transformer (LVDT), inertial sensor, or other sensor useful in determining position, velocity, acceleration, or orientation.

A controller 160 provides closed-loop control of flexible manipulator 110. Controller 160 includes an output interface 165 for providing control signals 166 to actuator(s) 130, and an input interface 170 for receiving signals 167 from sensor(s) 135, and for receiving signal(s) 168 from sensors 140, 145, 150, and 155.

Controller 160 receives or determines a desired end-effector 115 position, and controls actuator(s) 130 via control signals 166 to cause actuator(s) 130 to assert a force on a portion of flexible manipulator 110, thereby causing at least a portion of flexible manipulator 110 to move. Controller 160 monitors sensor signal(s) 167 to determine actual movement of actuator(s) 130, and monitors sensor signal(s) 168 to determine actual movement of the portions of flexible manipulator 110 monitored by sensors 140, 145, 150, or 155. As the environment of system 100 changes, controller 160 adapts to the environment, as described below. Environment changes include physical constraints in the path of flexible manipulator 110 such as obstacles and friction, non-idealities of flexible manipulator 110, and changes in actuator(s) 130 or components of flexible manipulator 110 due to age or use.

In FIG. 1, flexible manipulator 110 is illustrated as being separate from actuator(s) 130, sensors 135, 140, 145, 150, and 155 and controller 160. However, two or more of actuator(s) 130, sensors 135, 140, 145, 150, and 155 and controller 160 may be implemented as part of flexible manipulator 110, or implemented in combination. By way of example, all of the components of system 100 may be self-contained within one device; actuator(s) 130 may be within a housing (e.g., "skin") of flexible manipulator 110, one or more of sensors 135, 140, 145, 150, and 155 may be integrated in flexible manipulator 110, and so forth.

Controller 160 is, or includes, or is part of, a computing device. Portions of controller 160 may be implemented as computer-executable instructions in a memory.

Figure 2:
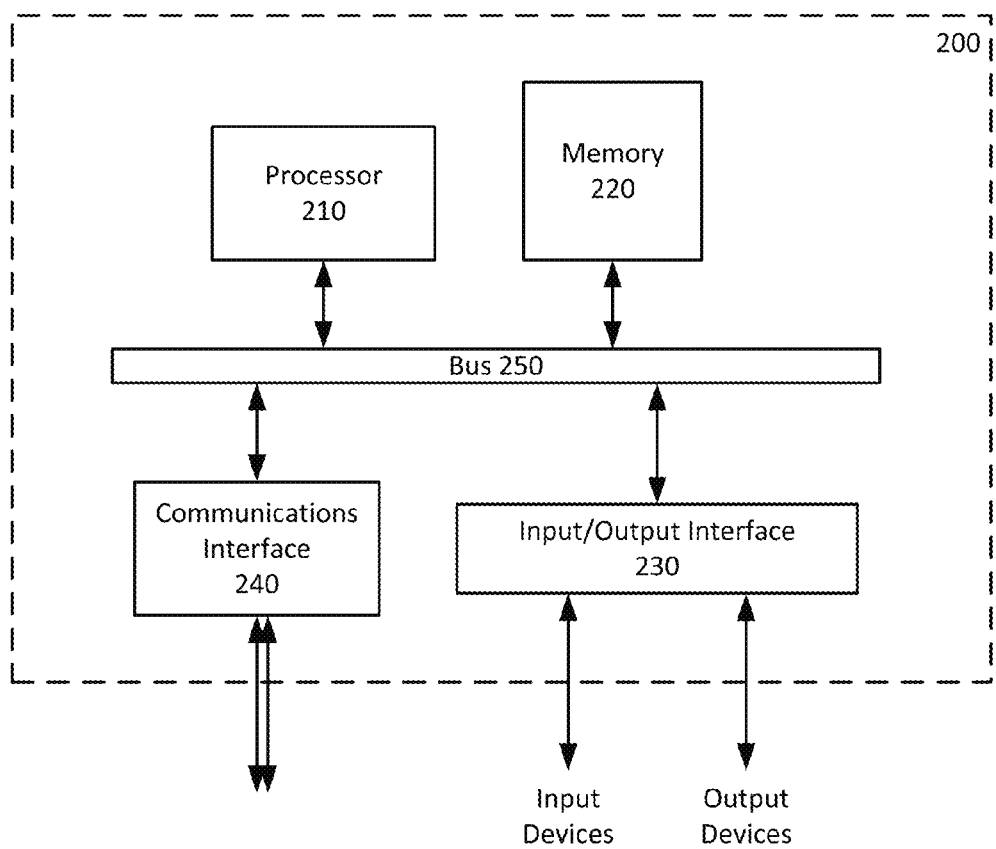
FIG. 2 illustrates an example of a computing device.

FIG. 2 illustrates an example of a computing device 200 that includes a processor 210, a memory 220, an input/output interface 230, and a communication interface 240. A bus 250 provides a communication path between two or more of the components of computing device 200. The components shown are provided by way of illustration and are not limiting. Computing device 200 may have additional or fewer components, or multiple of the same component.

Processor 210 represents one or more of a processor, microprocessor, microcontroller, ASIC, and/or FPGA, along with associated logic.

Memory 220 represents one or both of volatile and non-volatile memory for storing information. Examples of memory include semiconductor memory devices such as EPROM, EEPROM and flash memory devices, magnetic disks such as internal hard disks or removable disks, magneto-optical disks, CD-ROM and DVD-ROM disks, and the like.

Portions of controller 160 may be implemented as computer-executable instructions in memory 220 of computing device 200, executed by processor 210.

Input/output interface 230 represents electrical components and optional code that together provide an interface from the internal components of computing device 200 to external components. Examples include a driver integrated circuit with associated programming.

Communications interface 240 represents electrical components and optional code that together provide an interface from the internal components of computing device 200 to external networks.

Bus 250 represents one or more interfaces between components within computing device 200. For example, bus 250 may include a dedicated connection between processor 210 and memory 220 as well as a shared connection between processor 210 and multiple other components of computing device 200.

An embodiment of the disclosure relates to a non-transitory computer-readable storage medium having computer code thereon for performing various computer-implemented operations. The term "computer-readable storage medium" is used herein to include any medium that is capable of storing or encoding a sequence of instructions or computer codes for performing the operations, methodologies, and techniques described herein. The media and computer code may be those specially designed and constructed for the purposes of the embodiments of the disclosure, or they may be of the kind well known and available to those having skill in the computer software arts. Examples of computer-readable storage media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits ("ASICs"), programmable logic devices ("PLDs"), and ROM and RAM devices.

Examples of computer code include machine code, such as produced by a compiler, and files containing higher-level code that are executed by a computer using an interpreter or a compiler. For example, an embodiment of the disclosure may be implemented using Java, C++, or other object-oriented programming language and development tools. Additional examples of computer code include encrypted code and compressed code. Moreover, an embodiment of the disclosure may be downloaded as a computer program product, which may be transferred from a remote computer (e.g., a server computer) to a requesting computer (e.g., a client computer or a different server computer) via a transmission channel. Another embodiment of the disclosure may be implemented in hardwired circuitry in place of, or in combination with, machine-executable software instructions.

Model-Less Control

As described above, a flexible manipulator may include or be associated with a number of actuators such as actuator(s) 130. A relationship between an actuator position 'y' and a manipulator position 'x' may be described by a function $x=f(y)$. A local-linear approximation of function $x=f(y)$ is the mapping $\Delta x=J\Delta y$ for a location x, where the 'J' term is a matrix providing an expected relationship between movement of the actuators and resulting movement of the flexible manipulator. For example, matrix J may represent a Jacobian matrix. The control technique uses the mapping $\Delta x=J\Delta y$ to determine an expected movement $\Delta y$ of actuators in the plant to effectuate a desired movement $\Delta x$ in the plant. For example, a desired movement $\Delta x$ may be a movement of a segment of the flexible manipulator, and the expected movement $\Delta y$ may be the difference between a present position of an actuator and a new position of the actuator that is expected to cause the segment to move the desired amount $\Delta x$. The expected movement $\Delta y$ is converted by way of circuitry and logic into control information appropriate for the actuator (e.g., by controller 160). For instance, an expected movement $\Delta y$ may be converted into a change in current provided to a coil of a motor, or a change in voltage, magnetic field, or the like provided to another actuator device. An actuator may itself be controlled via a control loop, such as in a proportional (P) loop, integral (I) loop, differential (D) loop, PI loop, PD, loop, or PID loop.

Figure 3:
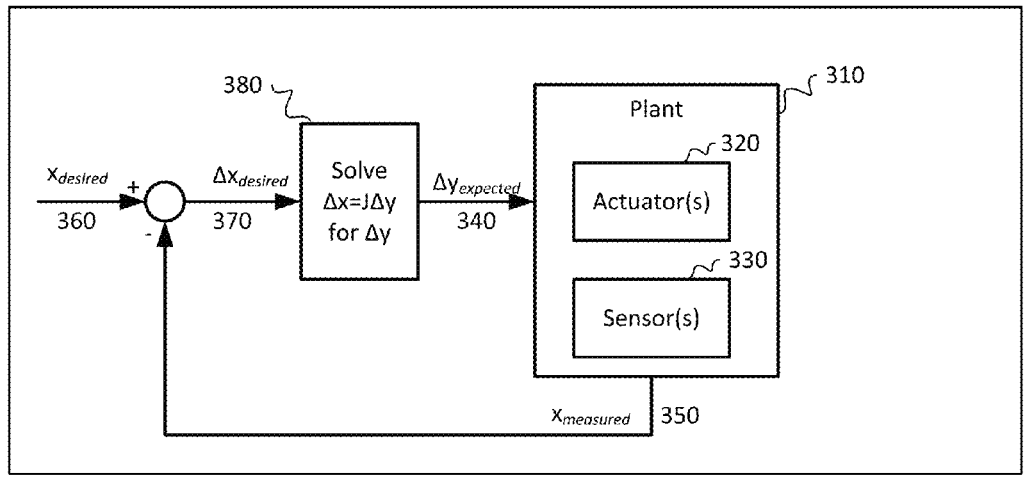
FIG. 3 illustrates an example of a control technique for a manipulator.

FIG. 3 illustrates an example of a control technique for a "plant" 310, such as a flexible manipulator with associated actuators, sensors, circuitry, and optional logic. FIG. 3 illustrates one or more actuators 320 and one or more sensors 330. An expected actuator change $\Delta y_{expected}$ 340 is received at plant 310, causing actuator(s) 320 to activate by an amount, which correspondingly causes a portion of plant 310 (i.e., a portion of the flexible manipulator) to move. The resulting new position of the flexible manipulator is provided by sensor(s) 330 as $x_{measured}$ 350, which is subtracted from a desired position $\Delta x_{desired}$ 360, and the difference (i.e., error) $\Delta x_{desired}$ 370 is applied to a solver block 380. A new value for $\Delta y_{expected}$ 340 is calculated from $\Delta x_{desired}$ 370 and matrix J, where J is the matrix in the mapping $\Delta x=J\Delta y$.

The system of FIG. 3 is limited in its ability to control a flexible manipulator. One reason for this is that matrix J is static whereas environmental conditions are dynamic. Environmental conditions such as aging, non-idealities of the manipulator (e.g., friction and backlash), material hysteresis, loading, obstacles, and other constraints may cause manipulator system reactions to change, where change may occur quickly (e.g., when an obstacle is encountered) or more slowly (e.g., with joint aging). Positioning accuracy and repeatability may be unpredictable, as the actual reaction of the system to a calculated value for $\Delta y$ may bear little resemblance to the expected reaction of the system. Thus, change may cause a static system such as the one illustrated in FIG. 3 to become confused and disoriented. Specifically with respect to a kinematic model-based matrix J, the kinematic model is determined based on specified characteristics of the manipulator and actuators. Even with expected manufacturing, aging, temperature, and other tolerances built into the kinematic model, these tolerances may not include actual changes experienced by the manipulator, and may not take into account non-idealities of the manipulator.

Figure 4:
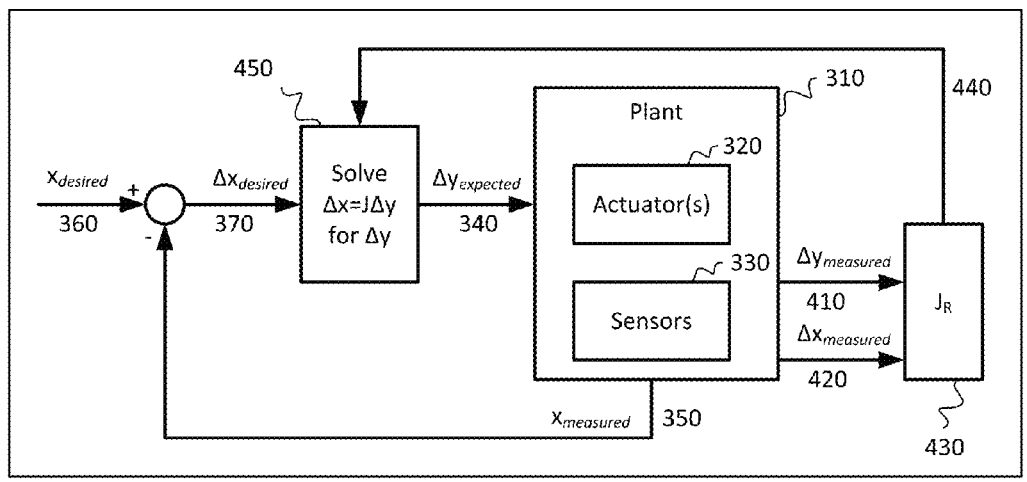
FIG. 4 illustrates another example of a control technique for a manipulator.

FIG. 4 illustrates an example of a dynamically-adaptable system using model-less control. The control technique calculates an estimate of matrix J from movement of the actuators and resultant movement of the flexible manipulator, and updates matrix J during operation of the flexible manipulator to adjust for the present environment, including adjusting for constraints, aging, non-idealities, and other influencing factors.

The components of FIG. 4 that are similar in relevant ways to the corresponding components of FIG. 3 are numbered as in FIG. 3, and are not further described in detail. In FIG. 4, as the flexible manipulator moves, movement $\Delta y_{measured}$ 410 of the actuators and a resulting movement $\Delta x_{measured}$ 420 of the flexible manipulator is supplied to a mapper 430, which uses the values to determine $J_R$, a recalculation of one or more elements of matrix J. The values of $J_R$ are provided over path 440 to solver block 450 to update matrix J dynamically, such that the flexible manipulator may adapt to the environment as the manipulator moves. The determination of $J_R$ may be performed for every new value of $\Delta y_{expected}$ 340 received by plant 310, or may be performed periodically, at the expiration of a timer, following a determination that $\Delta y_{measured}$ 410 is greater than or less than $\Delta y_{expected}$ 340 by more than a predefined amount, following a determination that $\Delta x_{desired}$ 370 is greater than or less than a threshold by a predefined amount, or following a determination that the output of another sensor 330 in plant 310 is greater than or less than a threshold by a predefined amount, for example.

The matrix J is of size 'm' by 'n', relating actuator movement to flexible manipulator movement. There is a matrix J for each position x in the manipulator workspace. Each column of matrix J relates to one actuator—an actuator may be controlled by multiple control signals, but the movement of the actuator is represented in matrix J in one column. In matrix J, the $i^{th}$ column represents the contribution of the $i^{th}$ actuator, $y_i$, on the position x of the flexible manipulator. The elements of matrix J represent the partial derivatives of the function x=f(y) at a position x, and could be determined from function x=f(y) if known:

$$J := \left[ \frac{\partial f(x)^T}{\partial y_1} \quad \cdots \quad \frac{\partial f(x)^T}{\partial y_n} \right]$$

Although a kinematic model may be used to create a known function x=f(y) from which to build a matrix J, the model may be inadequate to describe a flexible manipulator in an environment, and especially in a changing environment, as discussed above. This is particularly true as the flexibility of the manipulator increases. Therefore, the actual function x=f(y) relating actuator position and manipulator position will be unknown.

Accordingly, a technique that is useful in describing a broad range of flexible manipulators uses finite difference to empirically estimate matrix J for a position x: each actuator is activated by an incremental amount $\Delta y_i$, and matrix J constructed as $$J_i = \frac{\Delta x}{\Delta y_i} = \frac{x(y) - x(y + \Delta y_i)^T}{\Delta y_i},$$

where $J_i$ is the $i^{th}$ column. A weighting matrix may be used to normalize the actuator signals.

Given matrix J, actuator movements $\Delta y$ expected to effectuate a movement $\Delta x$ can be approximated by $\Delta y = J^{-1}(\Delta x)$. J is not necessarily invertible or a square matrix, so a matrix pseudo-inverse, $J^\dagger$ may be determined instead, such that $\Delta y = J^\dagger(\Delta x)$.

There may be some interaction between actuators, which can be accounted for in matrix J. For example, tendon-driven flexible manipulators may be redundantly actuated in order to achieve bi-directional actuation. In these cases, co-activation of tendons results in pretensions along the tendons and the body of the manipulator, which is a quantity of interest that can be minimized. Tendon tensions can be related to tendon displacements by a linear function, so a diagonal stiffness matrix may be defined as: $K \in R^{n \times n}$, such that $\Delta \tau = K \Delta y$, where $\tau$ is the tension in the tendons. Columns of K may be constructed by moving each actuator separately and measuring the change in tensions in all tendons. Tendon tensions $\tau$ may be measured using a force sensor for each tendon. Matrix K may be used to modify matrix J.

Update matrix $J_R$ is an 'm' by 'n' matrix described mathematically as:
optimize an objective function h
subject to $\Delta x = J_R \Delta y$
where $J_R$ is solved for given the measurements $\Delta x_{measured}$ 420 and $\Delta y_{measured}$ 410.

Because $J_R$ has a number of elements equal to 'm' times 'n' (i.e., m*n), $\Delta x = J_R \Delta y$ is a set of 'm' equations, and there are multiple, and possibly infinite, solutions for $J_R$. To converge on a solution, objective function h is optimized. The objective function h and its optimization are defined based on, for example, type of flexible manipulator or expected environment of the flexible manipulator.

In one implementation, the objective function h is $\Delta J$, the change in the matrix J over time, written as $h = \|\Delta J\|$. The notation $\|\cdot\|$ represents "norm", such as the Frobenius norm, L1-norm, L2-norm, L-infinity norm, Huber norm, or other norm. A norm may be selected to fit the flexible manipulator and/or to adapt the flexible manipulator to its task. An optimization of objective function $h = \|\Delta J\|$ may be to minimize $\|\Delta J\|$, so that the matrix changes smoothly, resulting in smoother movement of the flexible manipulator. The matrix $J_R$ using this objective function and optimization is described mathematically as:
minimize $\|\Delta J\|$
subject to $\Delta x = J_R \Delta y$ As discussed, matrix $J_R$ is used to update matrix J. For example, a first estimate of matrix J in the mapping $\Delta x = J \Delta y$ is denoted '$J_k$', and a second (updated) estimate of matrix J is denoted '$J_{k+1}$' where $J_{k+1} = J_k + J_R$. In this update, $J_R$ is essentially an error between the predicted change in manipulator pose $J_k \Delta y$ and the measured change in pose $\Delta x$, normalized by $\Delta y$. $J_R$ may be multiplied by a smoothing factor to gradually change the updates of matrix J.

In addition to optimization of the objective function, the optimization may be performed subject to restraints. For example, if an actuator moves through a range of angles, the optimization may be subject to restraints on actuator angle.

Figure 5A:
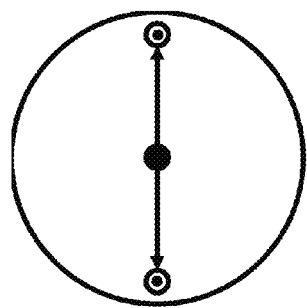
FIGS. 5A-C illustrate examples of fixed-geometry cabling for a tendon-driven flexible manipulator.
Figure 5B:
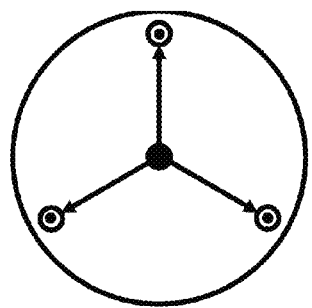
Figure 5C:
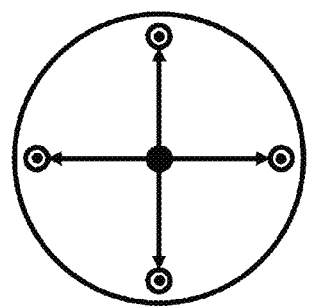

In one implementation, knowledge of the geometry of the actuators is used to set the restraints. FIGS. 5A-C illustrate example geometries for flexible manipulators using fixed-geometry cables. FIG. 5A represents a cross section of a flexible manipulator with two cables, FIG. 5B represents a cross section of a flexible manipulator with three cables, and FIG. 5C represents a cross section of a flexible manipulator with four cables. For the implementations of FIGS. 5A-C, the cables will have fixed angles with respect to each other, described in terms of vectors 'v' (e.g., vectors $v_0$, $v_1$, $v_2$, $v_3$ in FIGS. 5A-C).

By way of example, one matrix $J_R$ with objective function $\|\cdot\|$ and optimization minimizing $\|\cdot\|$ is described mathematically with restraints related to cable geometry as:
minimize $\|\Delta J\|$
subject to
$\Delta x = J_R \Delta y$
$J_R(:,i) = T_{i \to j} J_R(:,j)$ for any i, j=1 ... n, i≠j
where $J_R(:,x)$ represents column x of $J_R$. The transformation 'T' is the geometric relationship between the actuators.

Other restraints may, for example, include weightings of elements or columns of $J_R$. Restraints generally produce solutions that are targeted to a particular flexible manipulator.

An example of a matrix including restraints related to tendons for a tendon-driven flexible manipulator is as follows, given a desired displacement $\Delta x_d$ for the end-effector and solving for actuator displacements $\Delta y$:

$$\underset{\Delta y^k}{\text{minimize}} \; \|\tau + \Delta \tau\|_2$$

subject to $$\Delta x_d = \hat{J}^k W \Delta y^k$$

$$\tau + \Delta \tau \geq \epsilon$$

$$\Delta \tau = K \Delta y^k$$

where $\Delta y^k$ is the optimization variable and $j^k$ is the matrix J estimate from time k. The objective function to be minimized is the L2-norm of the tensions in the tendons, selected as $\|\tau + \Delta \tau\|_2$ in order to minimize the amount of unnecessary co-activation and axial compression on the manipulator and avoid buckling or damaging to the manipulator. The restraint equations are weighted by W; in addition, they ensure that tensions in each tendon must be greater than $\epsilon$, which is a minimal tension that forces the tendons to remain taut in order to avoid tendon slack.

Optimization relies on estimations of the matrix J, and the optimization of matrix J is estimated by solving the optimization problem:

$$\underset{\hat{J}^{k+1}}{\text{minimize}} \; \|\Delta \hat{J}\|_2$$

subject to $$\Delta x^k = \hat{J}^{k+1} W \Delta y^k$$

$$\hat{J}^{k+1} = \hat{J}^k + \Delta \hat{J}$$

where $\Delta \hat{J}$ is the optimization variable, $\hat{J}^k$ is matrix J at time k, $\hat{J}^{k+1}$ is the new estimate of matrix J at time k+1, and $\{\Delta x^k, \Delta y^k\}$ are measured displacements from actuator and manipulator sensors between times k and k+1. The Frobenius norm (element-wise L2-norm) of $\Delta \hat{J}$ was selected such that the column vectors of matrix J transition smoothly.

The mapping $\Delta x = J \Delta y$ was described above in terms of a local-linear approximation of function $x = f(y)$ at a location x. However, the concepts of this disclosure are not limited to local-linear approximations. Alternatively, a non-linear mapping $\Delta x = g(\Delta y)$ may be used, in which the parameters of 'g' are determined. For example, 'g' may be a polynomial function for which the polynomial coefficients are determined. In general terms, an inverse mapping of $x = f(y)$ is determined by acquiring the inverse of the function f, such that $y = f^{-1}(x)$. Similarly, an inverse mapping of function $\Delta x = f(\Delta y)$ is determined by acquiring the inverse of the function f, such that $\Delta y = f^{-1}(\Delta x)$.

Experimental Results

Abbreviations

Hz: Hertz (kHz: kilohertz; GHz: gigahertz)

mm: millimeter

N: Newtons psi: pounds per square inch

A flexible two-dimensional (2D) planar manipulator was constructed to evaluate the model-less control technique. The manipulator has a flexible backbone constructed of a polypropylene beam (length: 280 mm, cross-section: 0.8 mm×6 mm, 2500-5400 psi). The backbone is segmented into eight equal subsections by three-dimensional (3D) printed plates acting as tendon guides. The curvature of the backbone is driven by two 0.6 mm diameter stranded steel cables on either side, equidistant from the central backbone. Each cable terminates on a tension sensor (LSP-5, range: 0-5N) which rests on a linear slide and is servo-actuated to produce tendon actuation. The backbone and tendon actuation assembly is mounted on a servo-actuated carriage that supports uniaxial insertion/retraction, which decouples the insertion actuation from the tendon actuations. The three actuations for a planar manipulator form a redundantly-actuated system. A PID controller is implemented at each actuator for steady-state error rejection. A 640×480 pixel resolution video feedback was used as an uncalibrated camera for position feedback at 20 Hz. An optical marker was secured to the tip of the flexible manipulator. Using the OpenCV C++ coding library, color thresholding identified the optical marker, a Harris corner detector was used to extract the location of the saddle point in the marker to sub-pixel resolution. The camera was placed 50 mm from the 2D manipulator workspace pointed directly in line with the normal of the planar workspace, achieving a resolution of approximately 0.5 mm per pixel. To accommodate for sensor noise and the camera resolution, the matrix update step was performed only when the manipulator had moved more than 8 pixels (4 mm or 1.4% of the manipulator length), and the new estimate used a smoothing constant $\alpha=0.5$, where $\hat{J}^{k+1} = \hat{J}^k + \alpha \Delta \hat{J}$. These values were empirically acquired in order to minimize noise and digitization effects. Smoothing constant $\alpha$ was used as a simple tuning parameter for the matrix J estimate, where $0 \leq \alpha \leq 1.0$; the value $\alpha=0$ does not update the matrix J estimate and the value $\alpha=1.0$ replaces the prior matrix J estimate with its instantaneous estimate. The value $\alpha$ is generally adjusted lower when measurement noise is larger, acting as a smoothing filter.

The optimization used was to maintain a minimum tendon tension of $\tau=0.3$ N. The system was controlled through a 64-bit Windows 7 PC with an Intel 3.4 GHz i5 processor with 8 gigabyte RAM. The manipulator control and the camera feedback were run on separate threads; the camera feedback thread was run at 20 Hz, and the actuator control loop run at 1 kHz. Although a camera was used for position feedback, the technique is not reliant on any particular sensing modality and other sensors can be used for different circumstances (e.g. magnetic tracking or fiber Bragg sensing, which does not require line of sight).

The manipulator was able to move at approximately 30 mm/sec in an unconstrained environment. Because the model-less controller was defined as an optimization problem, objective functions that are convex (e.g. L1-norm, L2-norm, L-infinity norm) converged to a globally optimal solution, and convergence occurred typically within 10-14 iterations in the optimization solver using the C++ version of CVX, a convex optimization solver. Each optimization problem took 10±1.5 microseconds (mean±standard deviation), and therefore optimization was not a significant contributor to computation time.

Figure 6:
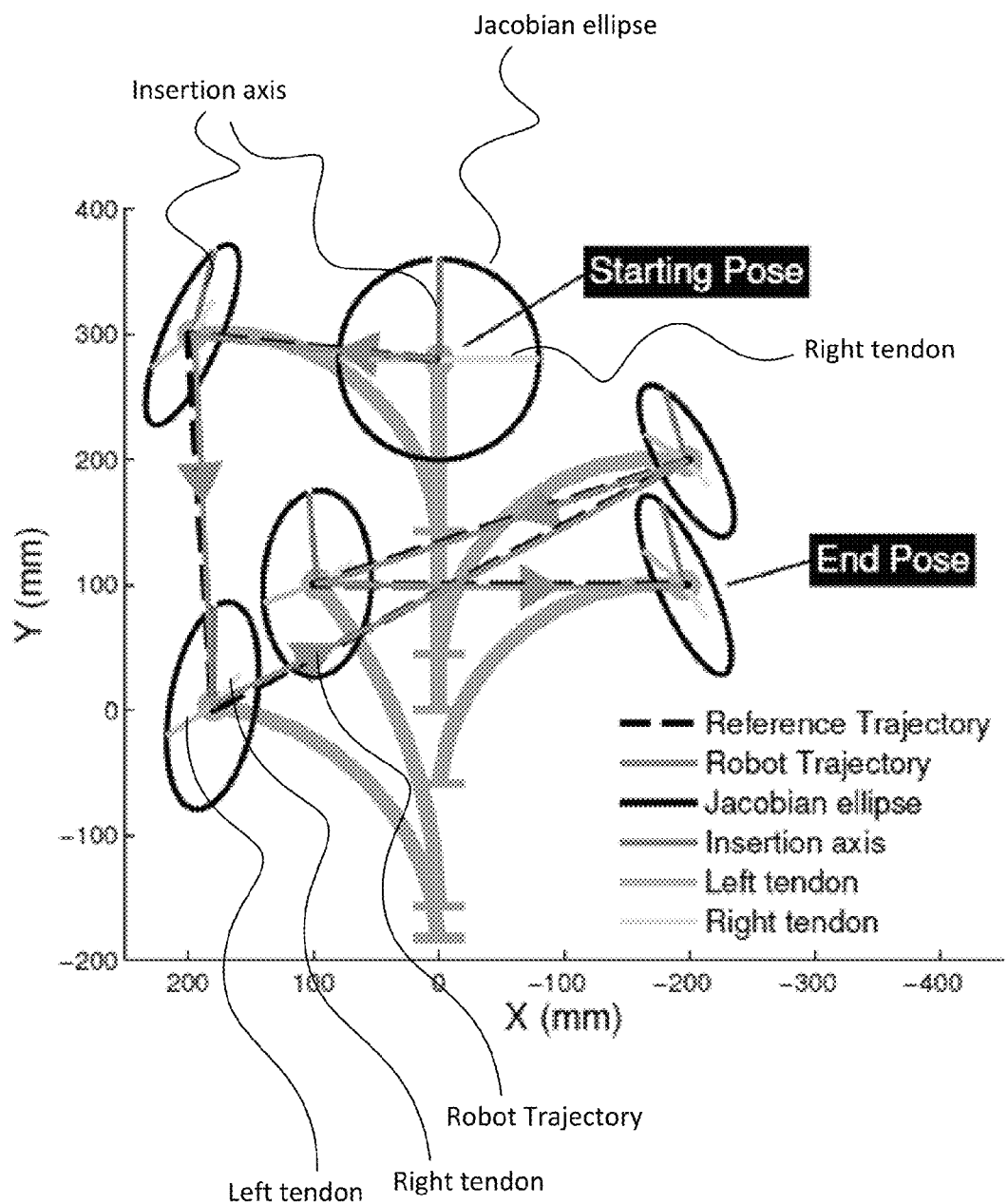
FIG. 6 illustrates a simulation of a manipulator moving in a simulated workspace.

Prior to implementation in a physical flexible manipulator, the model-less control technique was implemented in a MATLAB simulation to investigate its performance without effects of sensor noise, manipulator dynamics, and environmental constraints. FIG. 6 shows the manipulator moving in the simulated workspace to a set of randomly generated endpoints along paths referred to as "Robot Trajectory". The matrix J estimate at each endpoint is plotted as an ellipse, and each column of the matrix J estimate are shown as vectors within the ellipse. This shows the effect of a positive actuation of the insertion, left tendon and right tendon actuators on the end-effector position. Some of the elements shown are labeled for reference. It was observed that the matrix J ellipses become flatter as the manipulator extends further away from the insertion axis due to (i) the columns of matrix J attenuating such that the singular values of matrix J are scaled down, and (ii) the columns of matrix J rotating to become more in-line with one another. This behavior is expected as the manipulator reaches near the boundaries of the workspace. The ellipses also show that the matrix J estimates throughout the simulation are approximately correct but not exact. First, because the optimization method is attempting to solve an under-limited problem, there is more than one matrix J solution that satisfies the restraints. The calculated matrix estimate, which minimizes the change in its Frobenius norm, may therefore exhibit slight misalignments (both in simulation or in physical experiments). Second, some inevitable cross-coupling of the actuator effects on position will result in cross-coupling in the elements of matrix J. Third, the matrix J estimation uses backwards differencing to estimate matrix J, which therefore causes the estimate to lag the true matrix J.

Figure 7A:
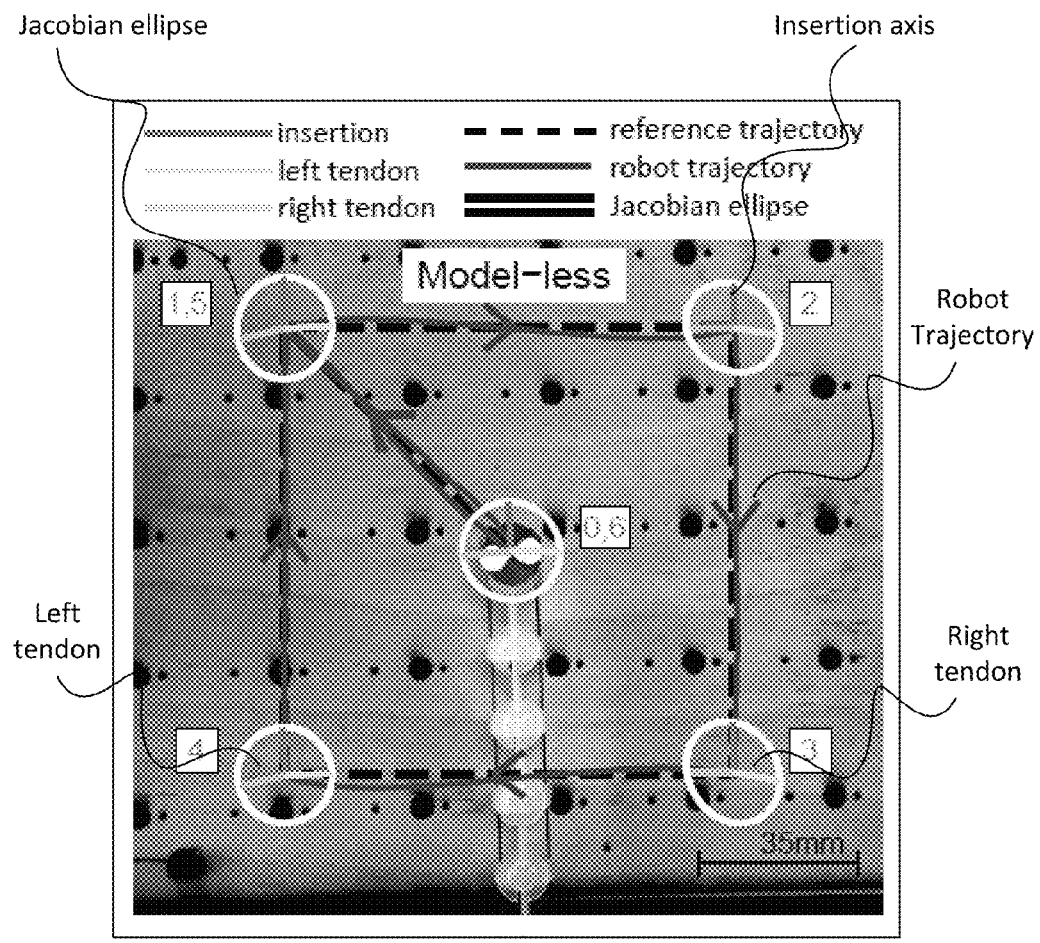
FIG. 7A illustrates an example of a trajectory followed by a tendon-driven flexible manipulator.
Figure 7B:
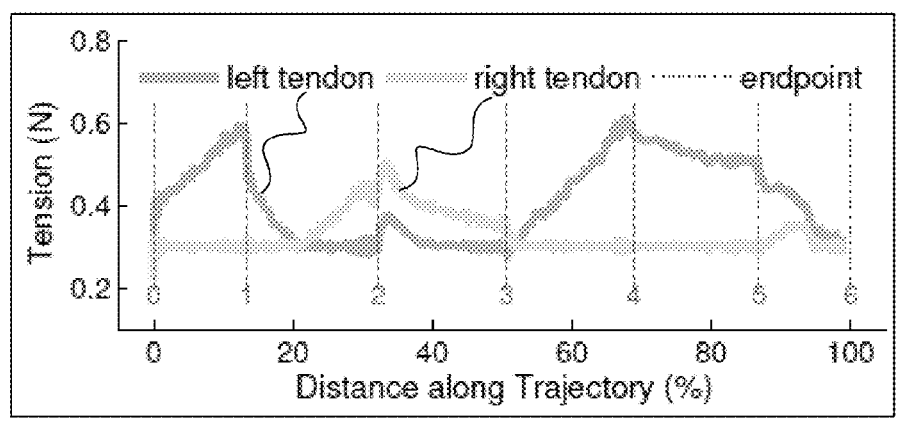
FIG. 7B illustrates tendon tension during the trajectory of FIG. 7A.

The control technique was also implemented on the experimental manipulator, and a square trajectory was given for the manipulator end-effector to trace. FIG. 7A illustrates the resultant manipulator trajectory (i.e., "robot trajectory") as the end-effector moved between the coordinate points. Given an unconstrained environment, the manipulator was able to move to the correct locations, with zero steady-state error (i.e., error was sub-pixel) using the model-less controller. FIG. 7B shows that the optimization framework is minimizing the tensions in the tendons, attempting to maintain a minimum tension to keep the system taut while tracking a trajectory. This minimizes both the axial compression of the manipulator and wasted co-activation energy in the tendons, and also results in smooth transitions in the tendon actuations.

Figure 8A:
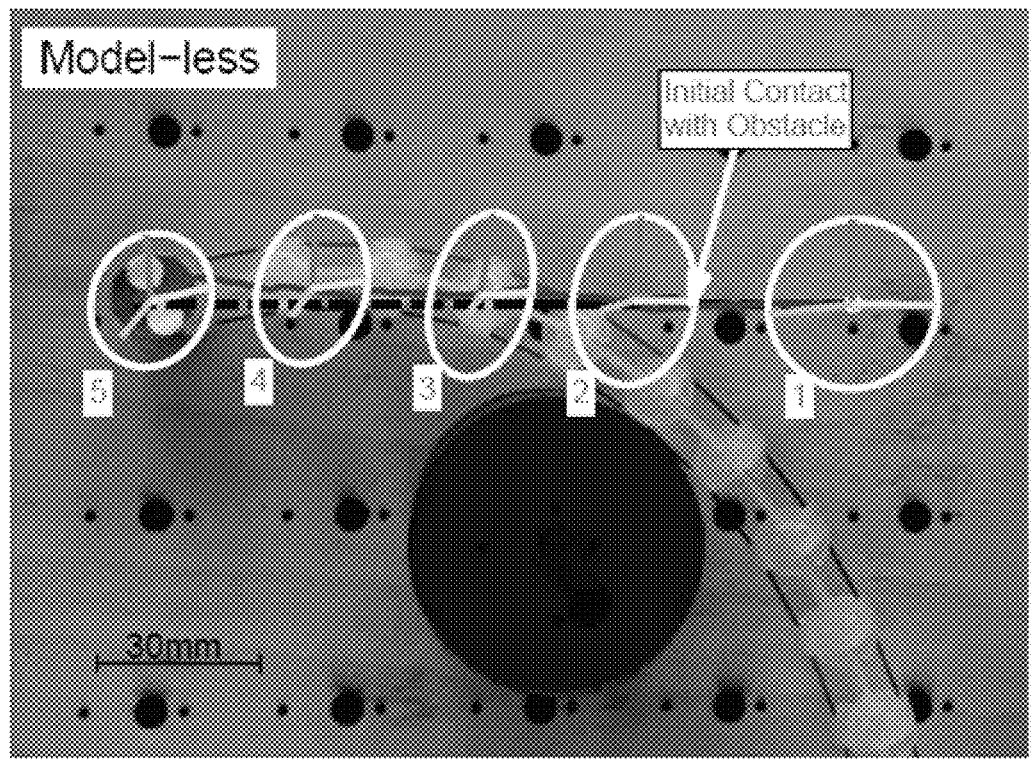
FIG. 8A illustrates an example of a trajectory followed by a tendon-driven flexible manipulator with an obstacle present.
Figure 8B:
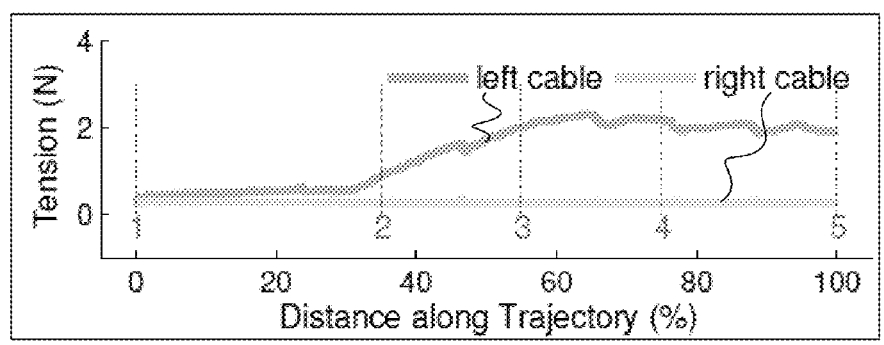
FIG. 8B illustrates tendon tension during the trajectory of FIG. 8A.
Figure 8C:
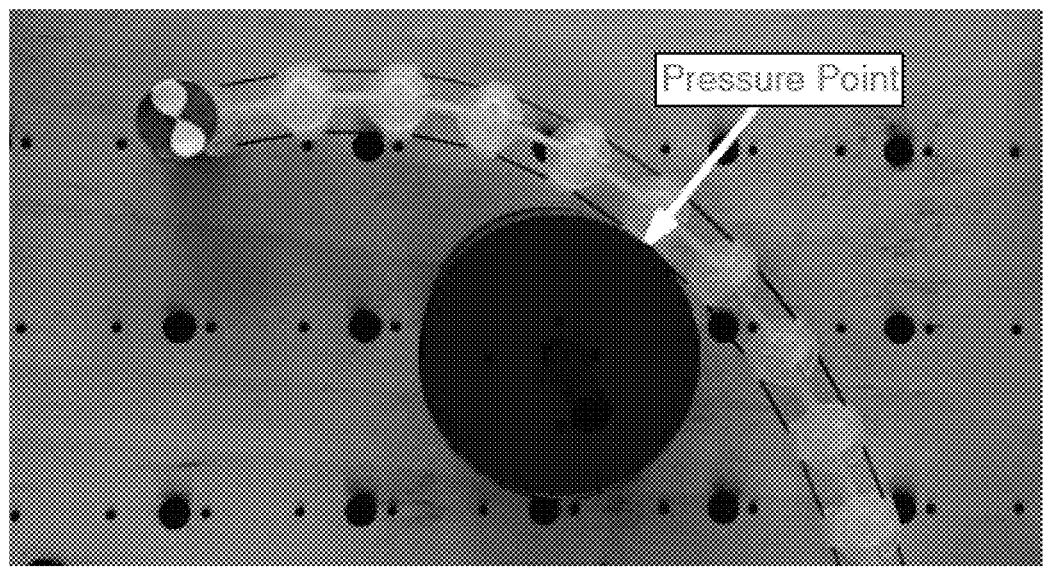
FIG. 8C illustrates the flexible manipulator at the end of its trajectory.

FIGS. 8A-C illustrate a constraint introduced into the environment of the flexible manipulator in the form of an obstacle. The manipulator was given a straight trajectory that would involve collision with the obstacle. Using model-less control, the manipulator was able to conform around the obstacle and extend past the obstacle to reach the target. FIG. 8A illustrates the reference and actual trajectories of the manipulators, with five model-less matrix J ellipses overlaid on FIG. 8A for five points along the trajectory. FIG. 8B illustrates the tension of the left and right cables as the manipulator progresses along the trajectory. The points 1-5 in FIG. 8B are the points 1-5 shown on FIG. 8A. There is a clear difference in the tension of the cables as the manipulator reaches and then extends past the obstacle. FIG. 8C illustrates the final configuration of the manipulator under model-less control.

Figure 8D:
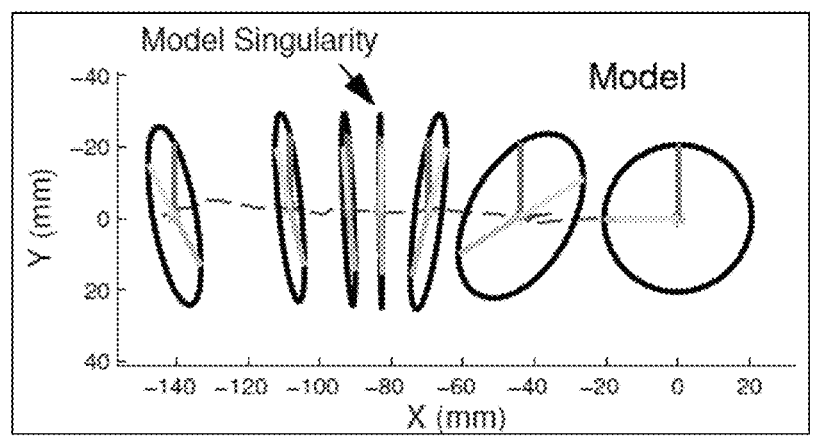
FIG. 8D illustrates how model-based control encounters a singularity caused by the obstacle of FIG. 8A.

In the trial illustrated by FIGS. 8A-C, the column vector for the left tendon attenuates as the manipulator moves into contact with the obstacle. The rotated direction of the left tendon vector allowed the model-less method to be successful in extending its reach past the obstacle: throughout the entire trajectory, a positive actuation in the left tendon allowed the manipulator to continue to move towards the left, which is demonstrated by the rotation and scaling of the matrix J estimate. In contrast, if a model-based approach had been used, the model-based estimate would not have accounted for the scaling and rotation due to the obstacle, and would have encountered a singularity. This singularity would have occurred where the tendon actuation and insertion actuator columns align, which is well before the endpoint was reached. In this simple example of a single obstacle interaction with the manipulator, a model-less control technique is able to avoid an artificial matrix J singularity that would have arisen in a model-based controller. FIG. 8D illustrates model-based matrix J ellipses calculated based on actuator displacement and overlaid on the tip trajectory for the trial of FIG. 8A. This demonstrates how a model-based method would become immobile prior to reaching the endpoint due to a singularity in the model matrix J.

Figure 9A:
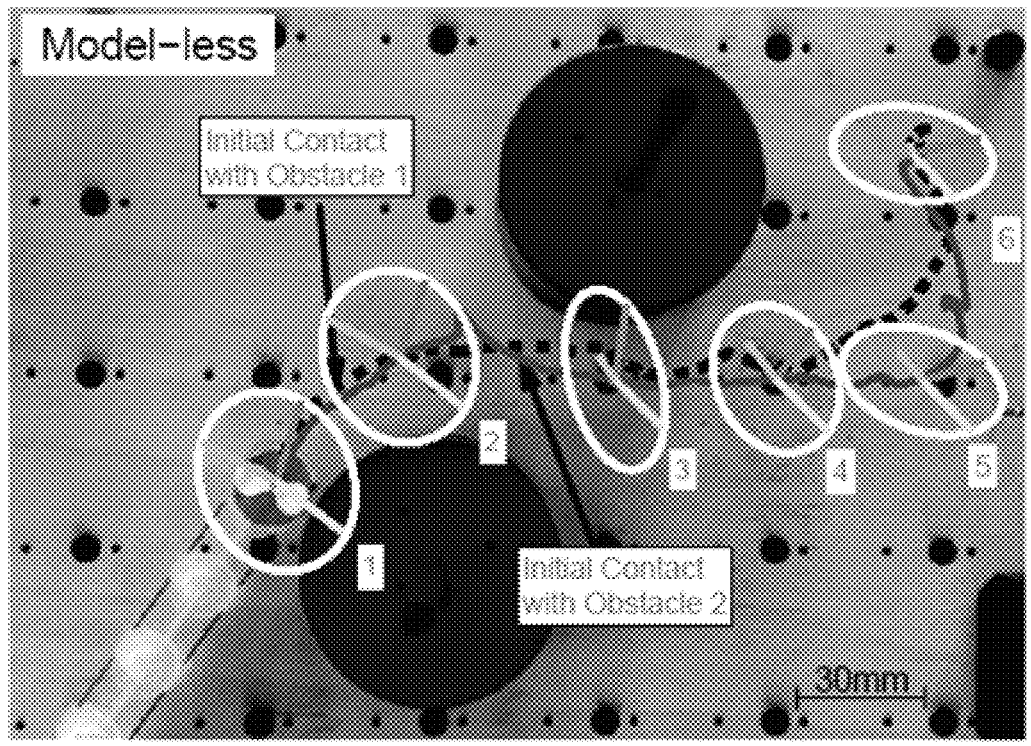
FIG. 9A illustrates an example of a trajectory followed by a tendon-driven flexible manipulator with two obstacles present.
Figure 9B:
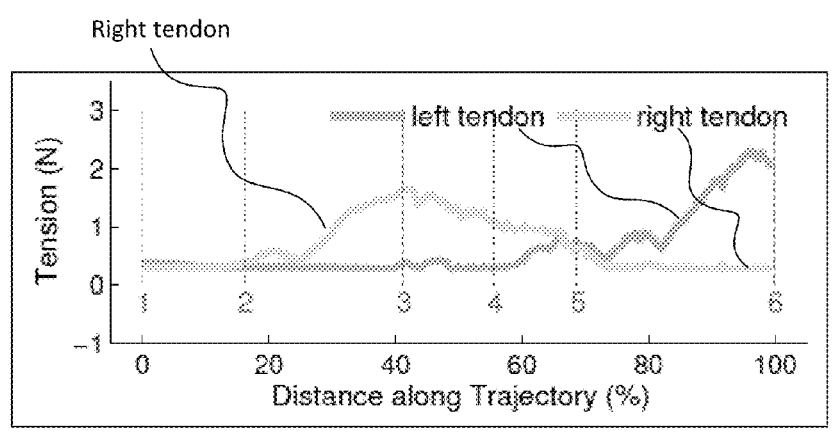
FIG. 9B illustrates tendon tension during the trajectory of FIG. 9A.
Figure 9C:
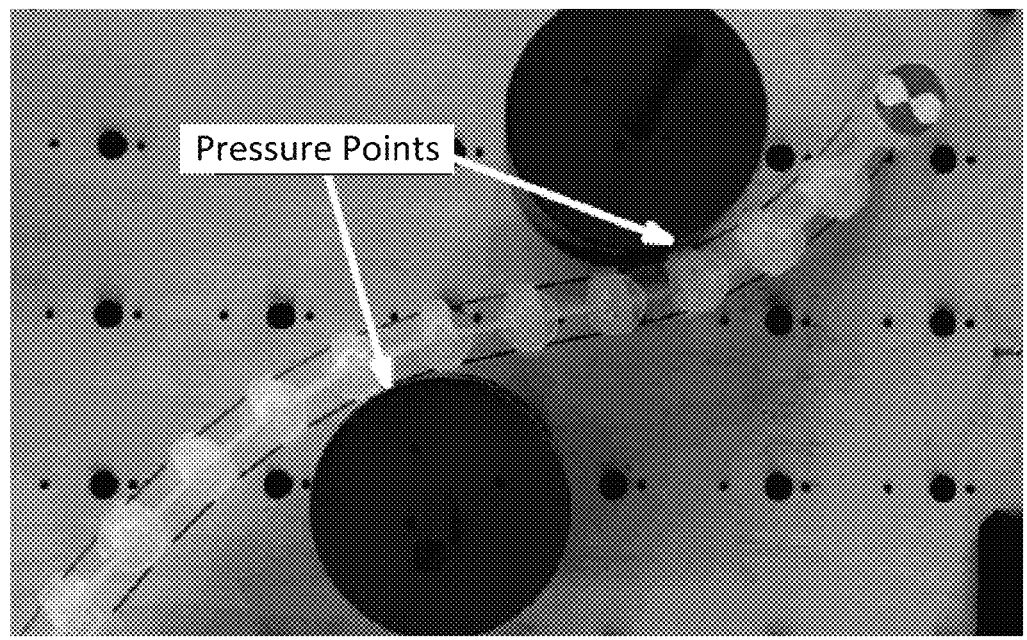
FIG. 9C illustrates the flexible manipulator at the end of its trajectory.

FIGS. 9A-C illustrate the capability of model-less control in a more complex environment involving multiple obstacles and points of contact on the manipulator. The manipulator was given a trajectory that would result in contact with multiple obstacles in the environment, and involved snaking through the obstacles, resulting in an S-shaped curve on the body, as shown in FIG. 9A. This trajectory was generated by having the manipulator attempt to track a computer mouse position as it traced a path through the channel in real-time. Using model-less control, the manipulator was successful at following the reference trajectory even as it encountered new obstacles and multiple points of contact on its body. FIG. 9B shows that the tendons effectively trade off actuation such that tension is minimized while still maintaining greater than 0.3N tension on each tendon. FIG. 9C illustrates the final configuration of the manipulator under model-less control.

Figure 9D:
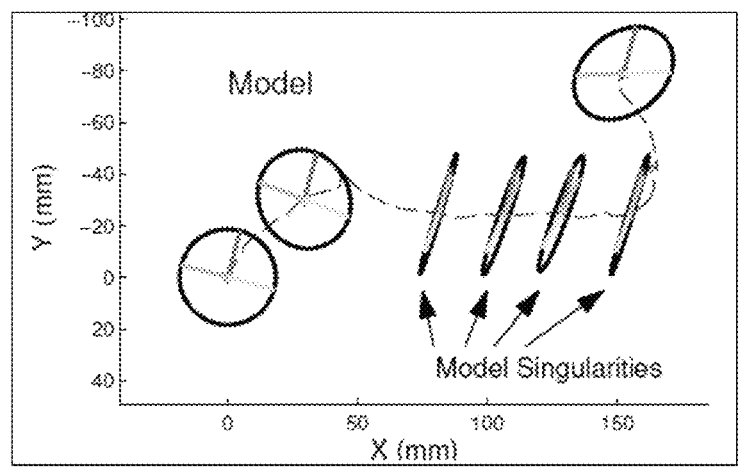
FIG. 9D illustrates how model-based control encounters multiple singularities caused by the obstacle of FIG. 9A.

As the manipulator becomes more constrained by the obstacles, the matrix J ellipse and column vectors diminish in size but remain well-conditioned. This accurately represents the scaling effect of an increasingly constrained manipulator body. In contrast, model-based matrices J become singular in several locations along the path and therefore would have been unable to trace very far along the reference trajectory. FIG. 9D illustrates model-based matrix J ellipses calculated based on actuator displacement and overlaid on the tip trajectory for the trial of FIG. 9A. This demonstrates how a model-based method would be become immobile prior to reaching the endpoint due to multiple singularities in the model matrix J.

Figure 10A:
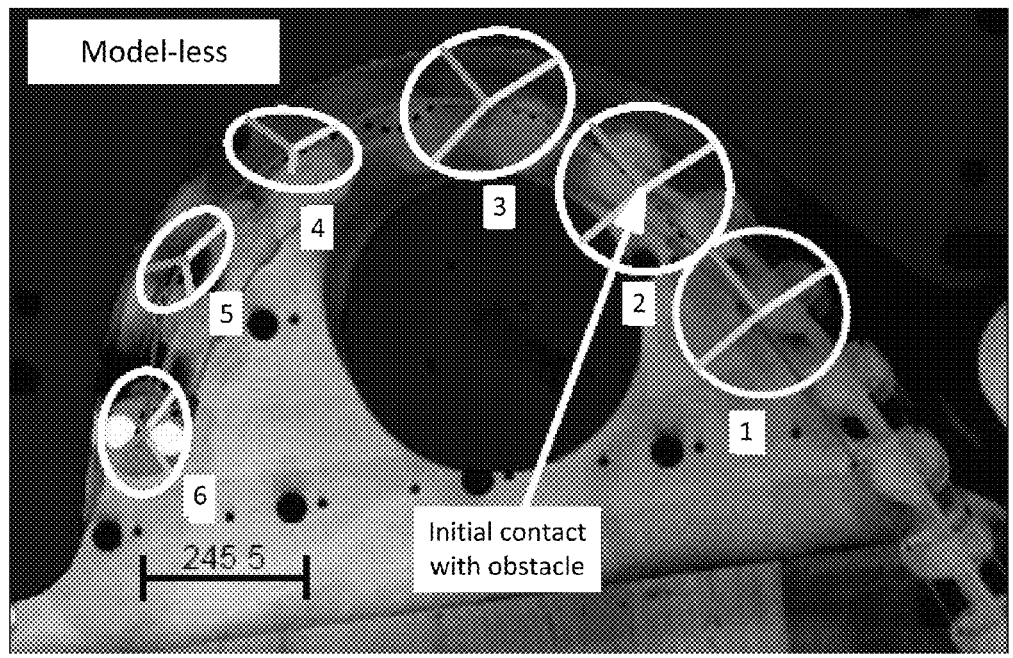
FIG. 10A illustrates an example of a trajectory followed by a tendon-driven flexible manipulator through a channel.
Figure 10B:
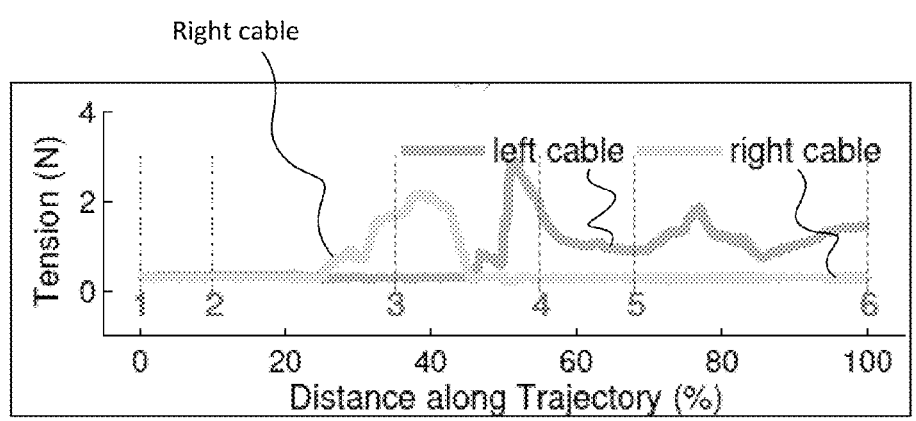
FIG. 10B illustrates tendon tension during the trajectory of FIG. 10A.
Figure 10C:
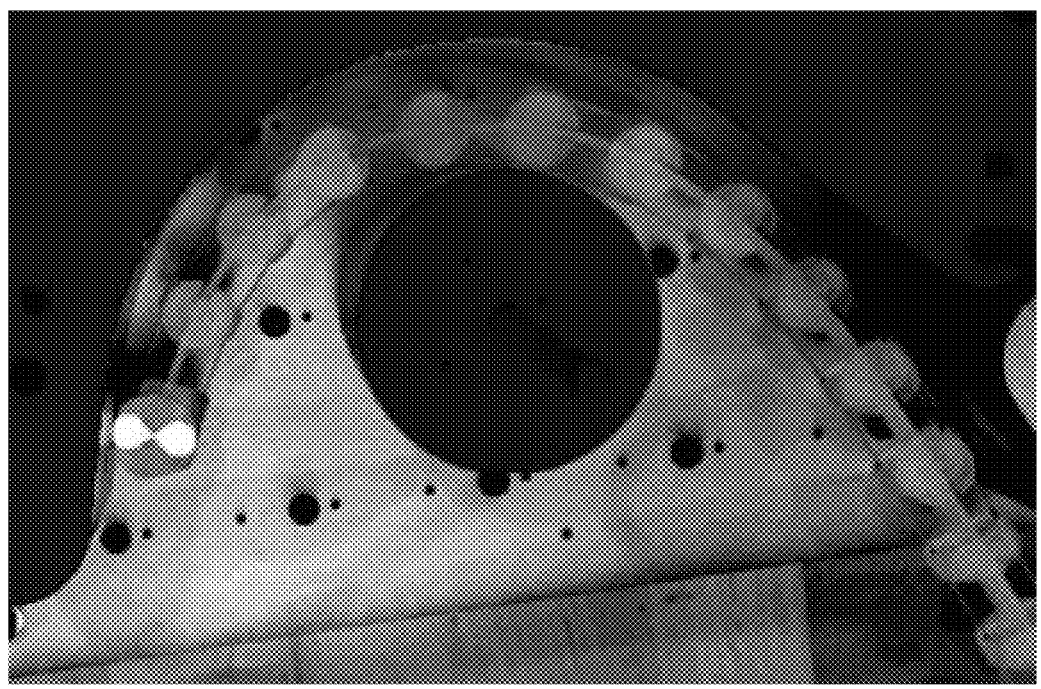
FIG. 10C illustrates the flexible manipulator at the end of its trajectory.

FIGS. 10A-C illustrate a flexible manipulator in a channel environment that involves a significant change in direction. The manipulator was given a predefined reference trajectory. FIG. 10A illustrates that the narrow channel causes the insertion column of the matrix J to rotate over 90 degrees. Using model-less control, the manipulator estimated this rotation and was successful at navigating the channel constraints. FIG. 10B shows the tensions in the cables during the trajectory, and FIG. 10C shows the final configuration of the robot body after successfully navigating the channel using model-less control.

Figure 10D:
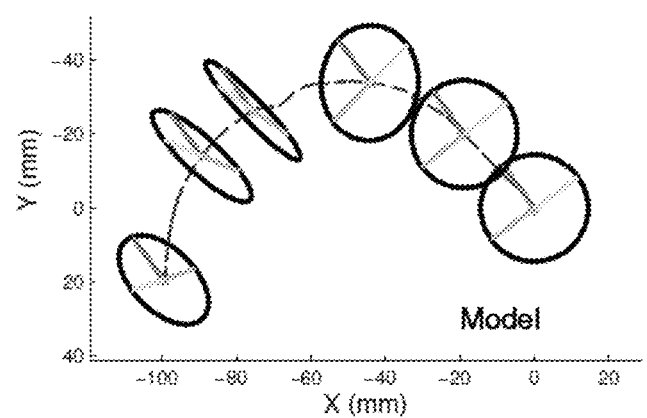
FIG. 10D illustrates how model-based control fails to adapt to the channel of FIG. 10A.

FIG. 10D illustrates that, for the channel environment of FIG. 10A, a model-based method without any information about the obstacles would have kept the insertion column constant in the model throughout the entire trajectory, resulting in an inverted mapping of actuator and end-effector movement. Under closed-loop control, this would have resulted in a positive-feedback loop and thus, unstable behavior.

Figures 11A, 11B:
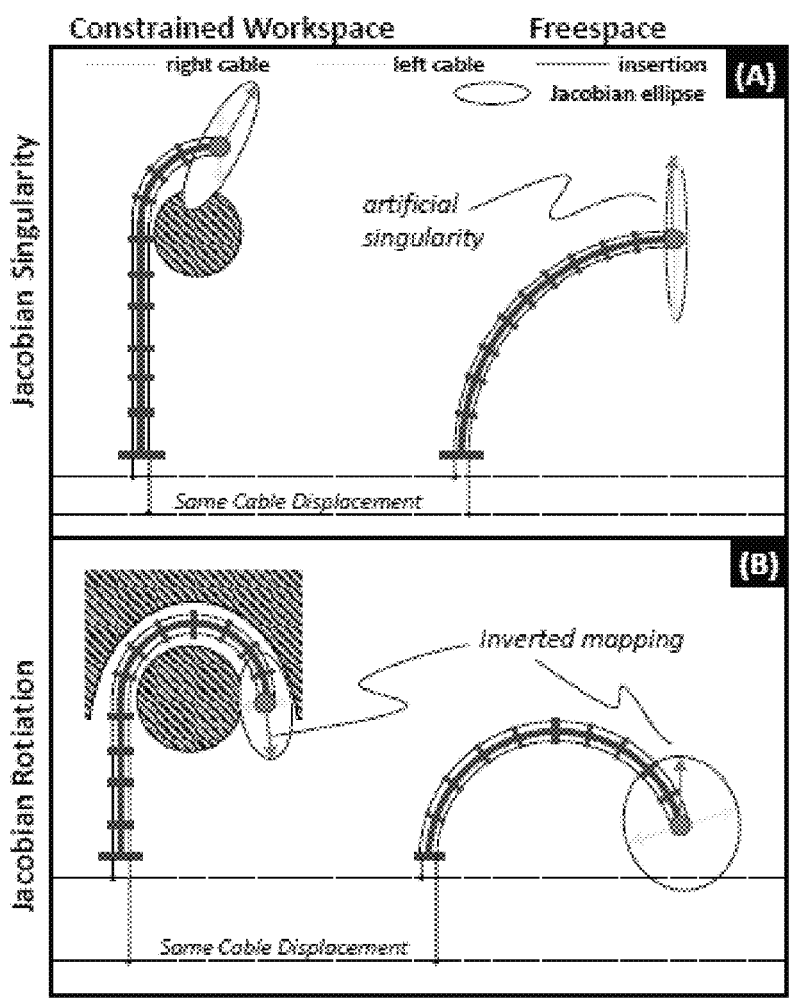
FIG. 11A illustrates differences between model-less control and modeled control in adapting to encountering an obstacle.
FIG. 11B illustrates differences between model-less control and modeled control in adapting to moving through a channel.

Two effects of constraints on the manipulator matrix J are scaling and rotation—scaling in the values of the matrix, and change in orientation of the column vectors, respectively. Un-sensed scaling and rotation can have adverse effects on model-based control. This is illustrated in the examples of FIGS. 11A-B. In FIG. 11A, the manipulator's interaction with an obstacle results in constrained motion. The true matrix J is scaled and rotated (illustration on the left side of FIG. 11A). However, because the model-based control does not know about the obstacle, it presumes that the manipulator is at the end of its workspace, and experiences an artificial singularity (illustration on the right side of FIG. 11A). In FIG. 11B, constraints have caused a difference in orientation between the columns of the model-space and the columns of the true matrix J. Therefore, the actuator's effect on position output is opposite to what is expected by the model-based control, resulting in a positive-feedback loop, risking damaging the manipulator and the environment.

As can be seen from the foregoing description and experimental results, model-less control may be used for controlling a flexible manipulator within unknown and changing environments. Because of the potentially infinite degrees of freedom, flexible manipulators interact with obstacles in unknown environments in a way that cannot be fully modeled or sensed. Thus, the adaptability provided by the model-less control described in this disclosure allows the flexible manipulator to operate where model-based manipulators cannot.

Figure 12:
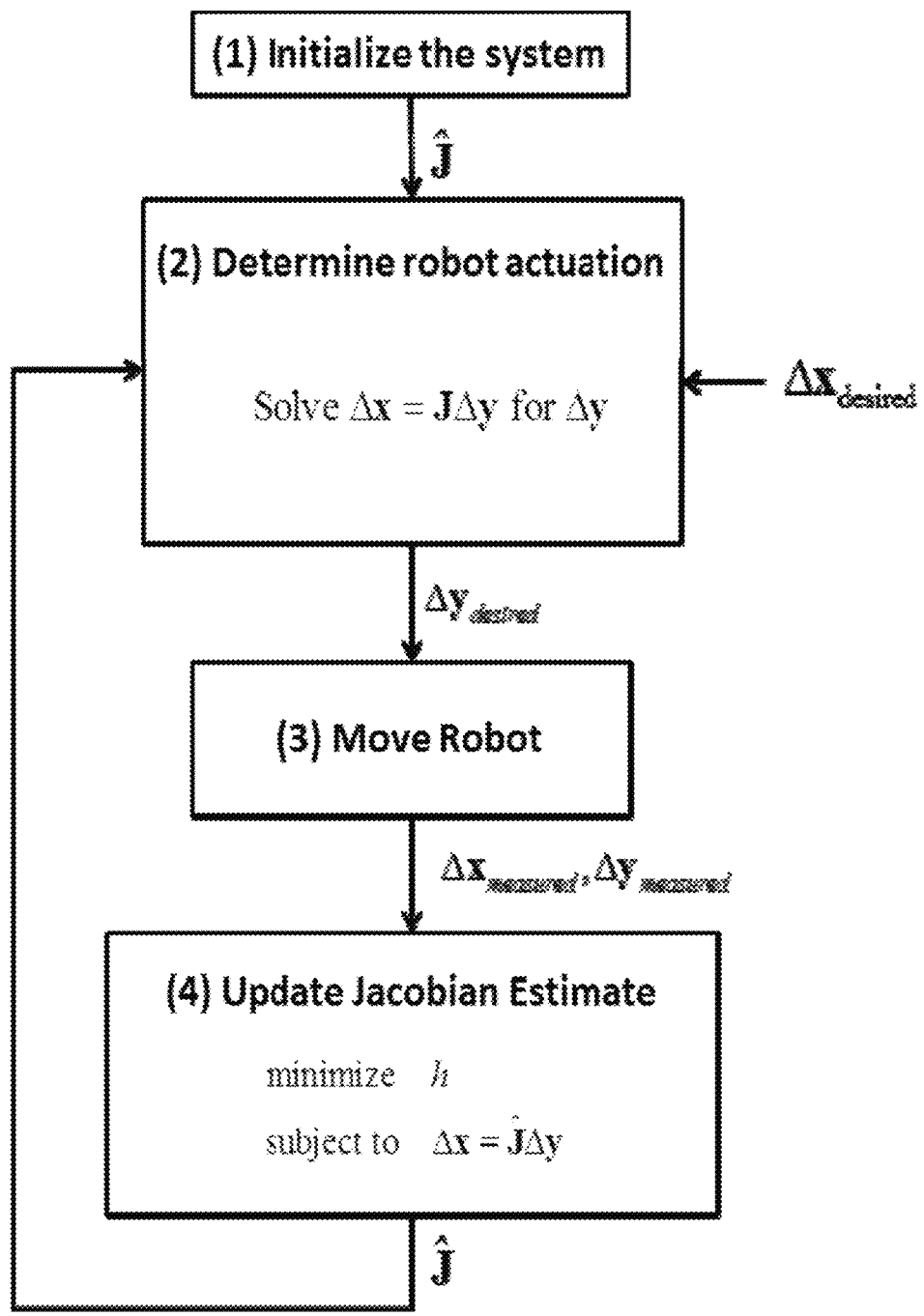
FIG. 12 illustrates a general example technique for optimized model-less control.

FIG. 12 illustrates a general example of model-less control for a flexible manipulator, to show how the various portions of the model-less control technique fit together. In block (1), the system is initialized by estimating a matrix J. In block (2), a desired movement of the manipulator, $\Delta x_{desired}$, is used to determine an estimate for actuator movement $\Delta y_{desired}$. In block (3), actual movements of the actuators and manipulator are used to determine an estimated update matrix, which is then used to update matrix J as the manipulator moves, to adapt to the present environment.

Figure 13:
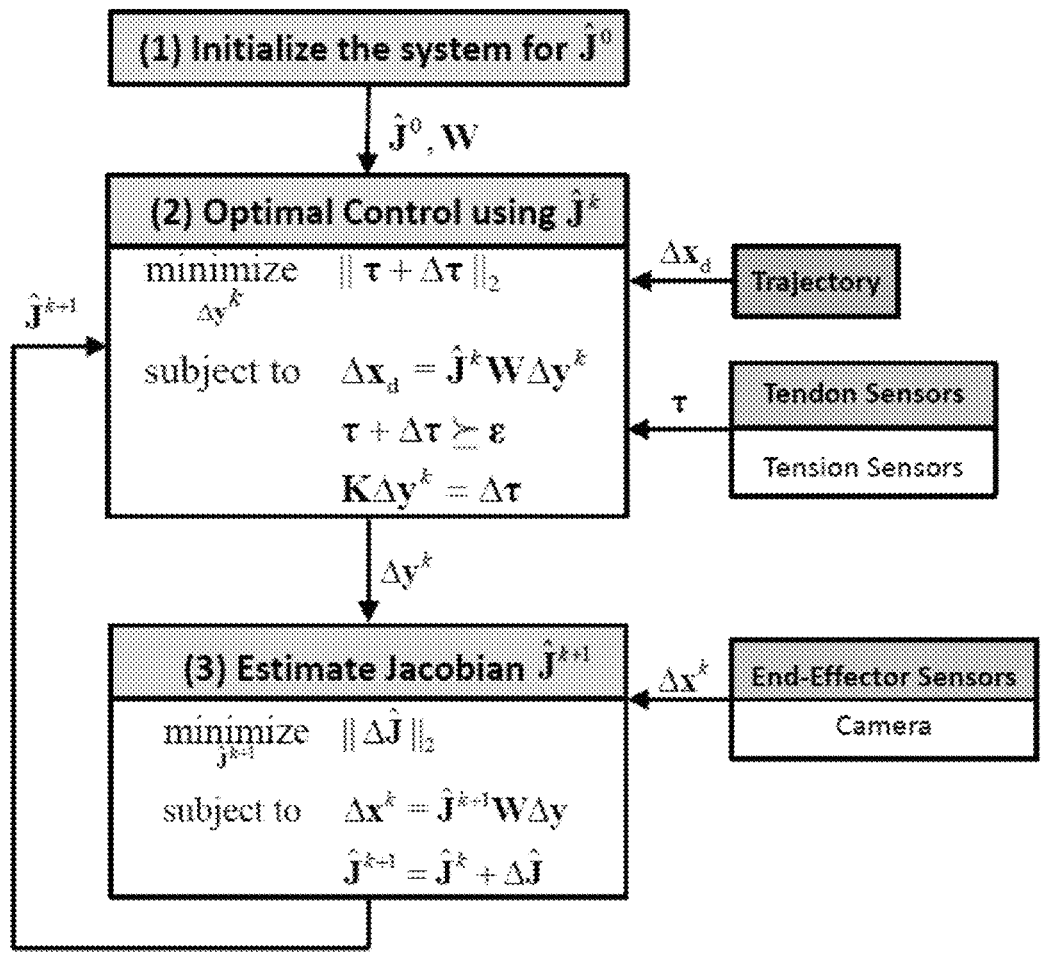
FIG. 13 illustrates a specific example technique for optimized model-less control.

FIG. 13 illustrates a specific example of model-less control for a tendon-driven flexible manipulator. In block (1), the system is initialized by estimating a matrix $J^0$. In block (2), a desired movement of the manipulator $\Delta x_d$ is used to determine an estimate for actuator movement $\Delta y^k$. In block (3), actual movements of the actuators and manipulator are used to determine an updated matrix $J^{k+1}$, which is then used to update matrix J as the manipulator moves, to adapt to the present environment.

Constraint scenarios will commonly occur in medical environments such as manipulating a catheter in the heart or through vasculature. When translating model-less control to an environment such as an operating table, manipulator control can be realized using magnetic sensors rather than camera positioning for feedback, where constraints and intra-cavitational manipulation blocks the line-of-sight. When line-of-sight is not an issue and a calibrated camera is available, techniques in position-based visual-serving can be used.

An advantage of model-less control is that, because there is no requirement for knowledge of the manipulator's configuration, it can be easy to adapt for manipulators with any number, type, or configuration of actuators, and for an n-dimensional taskspace. For example, implementing model-less control on a concentric tube manipulator with three concentric tubes (with roll and insertion actuation) for 3D Cartesian positioning would involve estimating a 3×6 matrix J.

In some embodiments, the ability of model-less control to track a reference trajectory is affected by the workspace environment. In an unconstrained environment, matrix J changes smoothly and therefore allows a manipulator under model-less control to track the reference well. When the manipulator becomes constrained, matrix J should change much faster, resulting in more tracking error. In practice, the error can vary depending on the trajectory and the obstacle; for example, a channel constraint may cause less tracking error than constraints of multiple obstacles. To reduce tracking error, estimation parameters may be adaptive rather than static, adapting the parameters of the matrix J estimation when tracking error increases.

To avoid a zero column of matrix J due to constraints on the flexible manipulator that impede the motion of the tip, tip constraints may be identified using additional sensing or heuristics. Performing singular value decomposition on matrix J will identify the nullspaces in the matrix; trajectories or actuations can be modified to avoid moving towards nullspaces and therefore keep matrix J of the manipulator well-conditioned. In addition, adding constraints to the optimization solver can be used to avoid zeroing the matrix J estimate. If the controller does somehow move into and become stuck at a singularity, the controller can perform an empirical matrix J initialization as described above to acquire a matrix J estimate for the location.

In some embodiments, model-less control relies on actuator and end-effector position signals for estimating the manipulator matrix J; therefore, the sensors should provide accurate and clean signals. Increased noise in the sensor measurements would specify greater signal processing and filtering. A method to account for noise is to adjust α, which acts as a moving average filter. However, both the α filter and the backward differencing of measurements in the matrix J estimation step contribute to phase lag in the system. Improving sensor resolution and reducing sensor noise allows matrix J estimation to be performed more frequently, resulting in less estimation lag.

Constraints on the optimization solver can be applied to keep the manipulator stable in practice, such as constraining the matrix J estimate to be well-conditioned, and ensuring that actuator and tension displacements and velocities are bounded. If a solution is infeasible then the manipulator motion can be terminated or the controller can adapt in some other reasonable way.

In sum, in accordance with the flexible manipulator control technique of this disclosure, no model of a flexible manipulator is necessary to control the manipulator. In contrast to a model, the minimum requirement of some embodiments of the model-less control is knowledge of how many actuators are controlled. The model-less control allows flexible manipulators to navigate around obstacles, contort, and flex in ambiguous configurations without becoming unstable or stuck in a virtual singularity. Thus, workspace coverage is improved. By defining the problem as an optimization problem, model-less control allows flexibility and control of the solutions to the mapping between actuator and manipulator movement for a wide range of manipulators and tasks.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. For example, the terms can refer to less than or equal to ±10%, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

While the disclosure has been described with reference to the specific embodiments thereof, it should be understood by those skilled in the art that various changes may be made and equivalents may be substituted without departing from the true spirit and scope of the disclosure as defined by the appended claims. In addition, many modifications may be made to adapt a particular situation, material, composition of matter, method, operation or operations, to the objective, spirit and scope of the disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations is not a limitation of the disclosure.

What is claimed is:

1. A control method, comprising:
empirically constructing for a flexible manipulator an estimated mapping between a movement of at least one actuator and a movement of an end-effector of the flexible manipulator;
measuring an actual movement of the at least one actuator and a resulting actual end-effector movement; and
based on the measuring, updating the estimated mapping while the flexible manipulator is active such that the mapping is adapted to a present environment of the flexible manipulator.

2. The method of claim 1, further comprising:
identifying a desired end-effector movement;
determining at least one actuator control signal value based on the estimated mapping and the desired end-effector movement;
providing the at least one actuator control signal value; and
after providing the at least one actuator control signal value, measuring the actual end-effector movement and the actual movement of the at least one actuator.

3. The method of claim 1, the updating including using an optimization function.

4. The method of claim 3, the optimization function minimizing a change in the estimated mapping due to the updating.

5. The method of claim 4, the minimizing achieved by minimizing a norm of the mapping, wherein the norm is one of a Frobenius norm, an L1-norm, an L2-norm and a Huber norm.

6. The method of claim 3, the optimization function maximizing a change in the estimated mapping due to the updating.

7. The method of claim 3, including using at least one restraint on the optimization.

8. The method of claim 7, the restraint being one of a weighting of at least one portion of the mapping, a restraint related to a geometry of the flexible manipulator, and a restraint related to a geometry of the at least one actuator.

9. The method of claim 1, wherein the mapping is a linear mapping.

10. The method of claim 1, wherein the mapping is a non-linear mapping.

11. The method of claim 1, wherein the mapping is a quadratic mapping.

12. The method of claim 1, wherein the mapping is a Jacobian mapping.

13. The method of claim 1, wherein updating the estimated mapping while the flexible manipulator is active expands a reachable workspace of the manipulator.

14. The method of claim 1, wherein updating the estimated mapping while the flexible manipulator is active avoids inverted mappings induced by the environment, thereby avoiding instability and positive feedback loops.

15. The method of claim 1, wherein empirically constructing the estimated mapping includes, for each of the at least one actuator:
providing values in a sequence to effectuate movement of the actuator;
after each value in the sequence of values, measuring a resulting movement of the actuator and a resulting movement of the end-effector; and
calculating a mapping relating expected actuator movement to expected end-effector movement based on the measured actuator movement and the measured end-effector movement.

16. A controller for a flexible manipulator, comprising:
an input interface coupled to a plurality of sensors, the sensors configured to sense movement of at least one actuator and an end-effector of the flexible manipulator;
an output interface; and
a processor in communication with the input interface and the output interface, the processor configured to:
provide at least one expected actuator movement value to the output interface;
receive from the input interface information representing an actual actuator movement and a resulting actual end-effector movement; and
update an estimated mapping between actuator movement and end-effector movement based on the received information;
wherein the estimated mapping is updated while the flexible manipulator is active such that the flexible manipulator adapts to its present environment.

17. The controller of claim 16, wherein the sensors include at least one position sensor.

18. The controller of claim 16, wherein the sensors include at least one accelerometer.

19. The controller of claim 16, wherein the mapping is a Jacobian mapping.

20. A non-transitory computer-readable medium comprising computer-executable instructions to:
identify a desired end-effector movement for a flexible manipulator;
determine from a predefined mapping at least one value for actuating at least one actuator, the value estimated to effectuate the desired end-effector movement by actuating the at least one actuator;
receive information representing an actual movement of the at least one actuator and an actual movement of the end-effector resulting from application of the at least one value; and
update the mapping based on the received information to adapt the flexible manipulator to its present environment.

21. The non-transitory computer-readable medium of claim 20, further comprising computer-executable instructions to:
provide a plurality of values in a sequence;
receive information representing movement of the at least one actuator and movement of the end-effector in response to providing the sequence of values;
construct a mapping relating actuator movement to end-effector movement; and
store the mapping as the predefined mapping.

22. The non-transitory computer-readable medium of claim 20, the computer-executable instructions to update the mapping including computer-executable instructions to use an optimization function with at least one restraint.

* * * * *